(12) United States Patent
Niwas et al.

(10) Patent No.: US 10,197,714 B2
(45) Date of Patent: Feb. 5, 2019

(54) COLORED RETROREFLECTIVE ARTICLES

(71) Applicant: 3M INNOVATIVE PROPERTIES COMPANY, St. Paul, MN (US)

(72) Inventors: Shri Niwas, Maple Grove, MN (US); Michael A. McCoy, Minneapolis, MN (US); Ying Xia, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/308,646

(22) PCT Filed: Apr. 30, 2015

(86) PCT No.: PCT/US2015/028394
§ 371 (c)(1),
(2) Date: Nov. 3, 2016

(87) PCT Pub. No.: WO2015/171406
PCT Pub. Date: Nov. 12, 2015

(65) Prior Publication Data
US 2017/0192142 A1  Jul. 6, 2017

Related U.S. Application Data

(60) Provisional application No. 61/990,989, filed on May 9, 2014.

(51) Int. Cl.
*G02B 5/128* (2006.01)
*B32B 3/00* (2006.01)
(Continued)

(52) U.S. Cl.
CPC ............... *G02B 5/128* (2013.01); *B32B 3/00* (2013.01); *B32B 7/02* (2013.01); *G02B 5/12* (2013.01); *G02B 5/124* (2013.01); *A41D 13/01* (2013.01)

(58) Field of Classification Search
None
See application file for complete search history.

(56) References Cited

U.S. PATENT DOCUMENTS

| 1,175,224 A | 3/1916 | Bleecker |
| 2,383,884 A | 8/1945 | Palmquist |
(Continued)

FOREIGN PATENT DOCUMENTS

| EP | 0203752 | 12/1986 |
| EP | 0683269 | 11/1995 |
(Continued)

OTHER PUBLICATIONS

Chopra, "Thin Film Phenomena", 750-761 (1969).
International Search Report for PCT International Application No. PCT/US2015/028394 dated Aug. 6, 2015, 4 pages.

*Primary Examiner* — Jennifer D. Carruth
(74) *Attorney, Agent, or Firm* — Jeffrey M. Olofson

(57) ABSTRACT

Retroreflective articles include a layer of optical elements, the layer of optical elements being divided into at least a first segment (110) and second segment (120), and a bead bond layer (170) containing a colorant. The optical elements are partially embedded in the bead bond layer. The optical elements include transparent microspheres (140), a transparent polymeric layer (180), and at least one reflective layer. In the first segment of optical elements, the reflective layer is a dielectric reflective layer (150), and in the second segment of optical elements, the reflective layer is a reflective metallic layer (160). The retroreflective articles have improved wash durability.

24 Claims, 5 Drawing Sheets

(51) Int. Cl.
    *B32B 7/02*         (2006.01)
    *G02B 5/12*         (2006.01)
    *G02B 5/124*       (2006.01)
    *A41D 13/01*       (2006.01)

(56) References Cited

U.S. PATENT DOCUMENTS

| | | |
|---|---|---|
| 2,461,011 A | 2/1949 | Taylor |
| 2,543,800 A | 3/1951 | Palmquist |
| 2,555,715 A | 6/1951 | Tatum |
| 2,726,161 A | 12/1955 | Beck |
| 2,842,446 A | 7/1958 | Beck |
| 2,853,393 A | 9/1958 | Beck |
| 2,870,030 A | 1/1959 | Stradley |
| 2,939,797 A | 6/1960 | Rindone |
| 2,965,921 A | 12/1960 | Bland |
| 2,992,122 A | 7/1961 | Beck |
| 3,468,681 A | 9/1969 | Jaupain |
| 3,700,305 A | 10/1972 | Bingham |
| 3,946,130 A | 3/1976 | Tung |
| 4,102,562 A | 7/1978 | Harper |
| 4,192,576 A | 3/1980 | Tung |
| 4,367,919 A | 1/1983 | Tung |
| 4,564,556 A | 1/1986 | Lange |
| 4,758,469 A | 7/1988 | Lange |
| 4,763,985 A | 8/1988 | Bingham |
| 4,772,511 A | 9/1988 | Wood |
| 4,931,414 A | 6/1990 | Wood |
| 4,950,525 A | 8/1990 | Bailey |
| 5,200,262 A | 4/1993 | Li |
| 5,283,101 A | 2/1994 | Li |
| 5,474,827 A | 12/1995 | Crandall |
| 5,620,613 A | 4/1997 | Olsen |
| 5,812,317 A | 9/1998 | Billingsley |
| 5,916,300 A | 6/1999 | Kirk |
| 5,988,821 A | 11/1999 | Tanaka |
| 6,153,128 A | 11/2000 | Lightle |
| 6,243,201 B1 | 6/2001 | Fleming |
| 6,361,850 B1 | 3/2002 | Billingsley |
| 6,416,856 B1 * | 7/2002 | Crandall ................ A41D 13/01 |
| | | 427/384 |
| 6,479,132 B2 | 11/2002 | Hedblom |
| 7,111,949 B2 | 9/2006 | Parisi |
| 7,303,292 B2 | 12/2007 | Yukawa |
| 8,256,025 B2 | 9/2012 | Feduzi |
| 2002/0037364 A1 | 3/2002 | Fleming |
| 2003/0156331 A1 | 8/2003 | Oie |
| 2006/0188700 A1 | 8/2006 | Yukawa |
| 2011/0045176 A1 | 2/2011 | Koppes |
| 2011/0292508 A1 | 12/2011 | Huang |
| 2013/0108784 A1 | 5/2013 | Koppes |

FOREIGN PATENT DOCUMENTS

| | | |
|---|---|---|
| ES | 2061379 | 12/1994 |
| WO | WO 1997-01776 | 1/1997 |
| WO | WO 00/23655 | 4/2000 |

* cited by examiner

# COLORED RETROREFLECTIVE ARTICLES

FIELD OF THE DISCLOSURE

This disclosure relates to retroreflective articles, especially colored retroreflective articles and methods of making and using them.

BACKGROUND

A wide variety of articles that incorporate the phenomenon of retroreflectivity have been developed for a wide array of uses. Retroreflective articles have the ability to return a substantial portion of incident light back towards the light source. This unique ability has promoted widespread use of retroreflective safety articles. Besides traffic and warning signs and the like, a wide variety of clothing and similar articles such as backpacks, and the like have incorporated retroreflective articles into them. Persons who work or exercise near motor vehicle traffic need to be conspicuously visible so that they do not get struck by passing motor vehicles. When retroreflective articles are worn, the retroreflectivity highlights a person's presence by retroreflecting light from motor vehicle headlamps.

Retroreflective articles typically have an optical lens element layer, a polymeric bead bond layer, a reflective layer, and may also have a substrate layer. The optical lens elements commonly are microspheres that are partially embedded in the polymeric bead bond layer. The reflective layer typically is aluminum, silver, or a dielectric mirror that usually is disposed on the embedded portions of the microspheres. Light striking the front surface of the retroreflective article passes through the microspheres and is reflected by the reflective layer to re-enter the microspheres where the light's direction is then altered to travel back towards the light source. Thus, for example, when a vehicle's headlamps strike a retroreflective article, some of the light from the headlamps is reflected back to the driver of the vehicle.

It is generally not necessary, or even desirable, that an entire worn article be retroreflective, so retroreflective appliqués are often used. These retroreflective appliqués can then be attached to an article of clothing or other article to prepare a retroreflective article. In some instances, retroreflective appliqués have been made by partially embedding a microsphere layer in a thermoplastic carrier web, applying a reflective material over the microspheres' protruding portions, and then forming a bead bond layer over the coated microspheres. Often a pressure sensitive adhesive is applied on the bead bond layer's back surface, and a release liner is placed over the adhesive until the appliqué is secured to a substrate. The completed appliqué (also sometimes referred to as a transfer sheet) is supplied to a garment assembler in this form, and the garment assembler secures the appliqué to an article of clothing by removing the release liner and adhering the appliqué to an outer surface of the article of clothing. The carrier is then separated from the appliqué to expose the microspheres so that the appliqué can retroreflect light.

A number of retroreflective articles have been prepared and described. For example, in U.S. Pat. No. 6,153,128 (Lightle et al.), retroreflective articles are described with first and second segments, each comprising a binder layer and a multitude of microspheres embedded in the front surface of the binder layer. The first segment has an opaque reflective metal layer disposed on the embedded portions of the microspheres, whereas the second segment lacks such an opaque reflective layer and thereby allows the color of the underlying binder layer to be seen. US Patent Publication No. 2011/0292508 (Huang et al.) describes an exposed lens retroreflective articles that includes a binder layer, a layer of spaced apart optical elements that are partially embedded in the binder layer, a penetrated colored layer that is located between the spaced apart optical elements, and a reflective layer that is located functionally behind the layer of optical elements and the penetrated colored layer.

SUMMARY

Disclosed herein are retroreflective articles, especially colored retroreflective articles, and methods of making and using them. In some embodiments, the retroreflective articles comprise a layer of optical elements, the layer of optical elements being divided into at least a first segment and second segment, and a bead bond layer comprising a colorant, where the optical elements are partially embedded in the bead bond layer. The optical elements comprise transparent microspheres, a transparent polymeric layer, and at least one reflective layer. In the first segment of optical elements, the reflective layer comprises a dielectric reflective layer, and in the second segment of optical elements, the reflective layer comprises a reflective metallic layer. The retroreflective articles may also comprise an additional segment or segments. The articles of this disclosure have improved wash durability.

Also disclosed are articles of clothing comprising a fabric with a first major surface and a second major surface; and a retroreflective appliqué attached to the first major surface of the fabric. The retroreflective appliqué comprises a layer of optical elements, the layer of optical elements being divided into at least a first segment and second segment, and a bead bond layer comprising a colorant, where the optical elements are partially embedded in the bead bond layer. The optical elements comprise transparent microspheres, a transparent polymeric layer, and at least one reflective layer. In the first segment of optical elements, the reflective layer comprises a dielectric reflective layer, and in the second segment of optical elements, the reflective layer comprises a reflective metallic layer.

Also disclosed are methods of preparing retroreflective articles. In some embodiments, the method of preparing retroreflective articles comprises providing a polymeric carrier layer with a first major surface and a second major surface, providing transparent microspheres, partially embedding the transparent microspheres into the first major surface of the polymeric carrier layer such that the beads at least partially protrude from the first major surface of the polymeric carrier layer to form a layer of microspheres, depositing a transparent polymeric layer on the layer of microspheres, depositing a first reflective layer on at least a portion of the first major surface of the polymeric carrier layer and the layer of microspheres, depositing a second reflective layer on at least a portion of the first major surface of the polymeric carrier layer and the layer of microspheres, applying a bead bond layer comprising a colorant to the layer of microspheres; and removing the polymeric carrier layer.

Also disclosed are intermediate articles. Intermediate articles are the articles prepared by the methods described above, in which the polymeric carrier layer has not yet been removed. The intermediate articles include articles comprising a polymeric carrier layer with a first major surface and a second major surface, a layer of optical elements, partially embedded in the first major surface of the polymeric carrier layer, and a bead bond layer comprising a colorant disposed on the layer of optical elements. The optical elements comprise transparent microspheres, a transparent polymeric layer, and at least one reflective layer. The layer of optical elements is divided into at least a first segment and second segment, where in the first segment of optical elements, the reflective layer comprises a dielectric reflective layer, and in the second segment of optical elements, the reflective layer comprises a reflective metallic layer.

BRIEF DESCRIPTION OF THE DRAWINGS

The present application may be more completely understood in consideration of the following detailed description of various embodiments of the disclosure in connection with the accompanying drawings.

Figure 1:
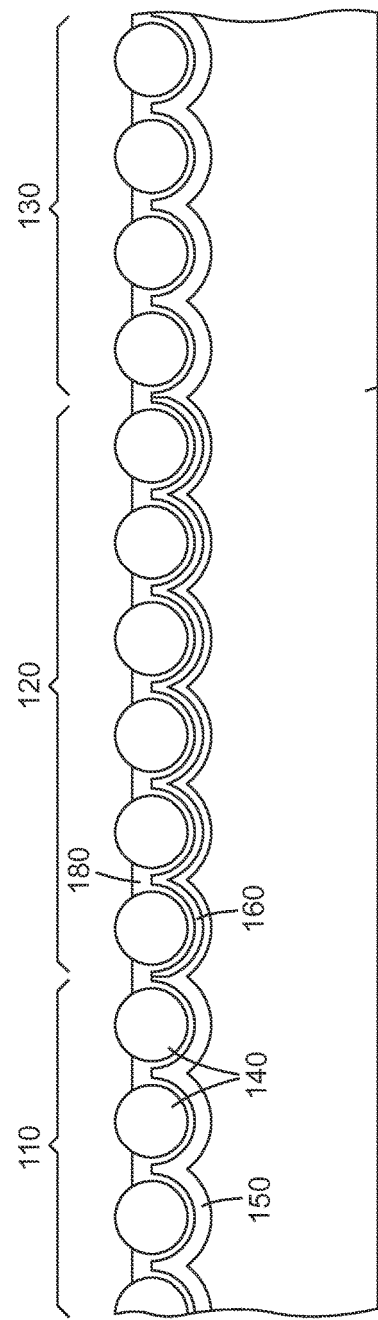
FIG. 1 shows a cross-sectional view of an embodiment of an article of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale like numbers used in the figures refer to like components. However, it will be understood that the use of a number to refer to a component in a given figure is not intended to limit the component in another figure labeled with the same number.

DETAILED DESCRIPTION

The desirability of making a wide variety of articles retroreflective has led to the increasing use of retroreflective articles. In some applications, an entire article may be made retroreflective; in others a portion of the article may be made retroreflective through the use of one or more retroreflective appliqués. The retroreflective articles typically have an optical element layer, a polymeric bead bond layer, and a reflective layer. The optical elements commonly are microspheres that are partially embedded in the polymeric bead bond layer. The reflective layer typically is aluminum, silver, or a dielectric mirror that usually is disposed on the embedded portions of the microspheres. Light striking the front surface of the retroreflective article passes through the microspheres and is reflected by the reflective layer to re-enter the microspheres where the light's direction is then altered to travel back towards the light source. Thus, for example, when a vehicle's headlamps strike a retroreflective article, some of the light from the headlamps is reflected back to the driver of the vehicle. This permits the driver of the vehicle to be aware of the person wearing the retroreflective article long before the driver would see the person if he or she were not wearing the retroreflective article. These retroreflective articles and appliqués can be attached to a wide range of articles, including everything from bicycles and motorized vehicles to a wide range of clothing such as jackets, vests, shirts, shoes, hats, and the like.

A variety of articles are retroreflective or have retroreflective appliqués that combine retroreflectivity with bright or fluorescent colors. Often articles have strips of retroreflective material and adjacent stripes of bright or fluorescent colors. In this way the articles provide high visibility in daylight due to the brightly colored or fluorescent strips and also are retroreflective for high visibility at night. An example is an article having two fluorescent yellow strips with a retroreflective strip located between the fluorescent yellow strips.

To even further increase the visibility it would be desirable to have retroreflective articles that have strips that are retroreflective and other strips that have bright and fluorescent colors for high visibility in daylight, but where the strips that have bright or fluorescent colors also are retroreflective. In this way, not only does the article have high visibility in daylight due to the bright or fluorescent colors, but the article has greater night visibility due to the increased retroreflectivity. This increased retroreflectivity not only enhances safety by increasing the visibility of the wearer, it also permits the use of smaller retroreflective articles to achieve this enhanced visibility. For example, if retroreflective appliqués are used to enhance the night visibility of an article of clothing, fewer appliqués or smaller appliqués can be used.

However, making an article both entirely retroreflective as well as highly colored, is difficult to achieve because of the way that retroreflective articles are made and how retroreflectivity is achieved. Typically retroreflective articles are prepared in a multi-step process. In this process, a thermoplastic polymeric carrier layer has a plurality of transparent microspheres partially embedded in it. A reflective layer, typically a reflective metal layer such as aluminum, silver or the like, is applied to the protruding transparent microspheres. A bead bond layer is applied to the coated microsphere layer, a transfer adhesive or fabric may be adhered to the bead bond layer, and the thermoplastic polymeric carrier layer is removed to generate the retroreflective article. When the article is colored, the coloring agent, either a pigment, a dye or a combination thereof, is placed in the bead bond layer. Because the reflective metal layer is visibly opaque, when viewed through the transparent microspheres the colored bead bond layer is not visible. Therefore, regions that are retroreflective do not show the color, and regions that show the color, because there is no reflective metal layer on the beads, are not retroreflective.

In this disclosure, articles are described that have the desired feature of having segments that are retroreflective, and segments that are highly colored and retroreflective. In some embodiments, the retroreflective articles comprise a layer of optical elements divided into at least a first segment and a second segment. The optical elements are transparent microspheres and at least one reflective layer. The optical elements are embedded in a bead bond layer, where the bead bond layer includes a colorant. In the first segment of optical elements, the reflective layer comprises a dielectric reflective layer, and in the second segment of optical elements, the reflective layer comprises a reflective metallic layer. As will be described below, in some embodiments, the reflective layer in the second segment of optical elements comprises both a reflective metal layer and a dielectric reflective layer.

Additionally, the articles of this disclosure have a protective transparent layer that provides protection to the retroreflective layer and enhances the durability of the retroreflective article, especially the wash durability of the retroreflective article. Since it is desirable that the articles that are made retroreflective be washable, wash durability is particularly important. By wash durability it is meant the number of times that the article can be laundered while maintaining its retroreflective performance. In addition, in the sections where the reflective layer is a multi-layer dielectric reflecting layer comprising alternating layers of low refractive index material and high refractive index material, the protective transparent polymeric layer functions not only as a protective layer, but also as a low refractive index layer component of the multi-layer dielectric reflective layer. All of these effects will be discussed in greater detail below. One concern in adding polymeric layers between the transparent microspheres and the reflecting layer is that this added layer can interfere with the retroreflective performance of the article since both incident and reflective rays of light have to pass through this layer. By making the protective layer part of the multi-layer dielectric mirror construction, this concern is eliminated.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives, heat activated adhesives and laminating adhesives.

Pressure sensitive adhesive compositions are well known to those of ordinary skill in the art to possess properties including the following: (1) aggressive and permanent tack at room temperature, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Heat activated adhesives are non-tacky at room temperature but become tacky and capable of bonding to a substrate at elevated temperatures. These adhesives usually have a Tg or melting point (Tm) above room temperature. When the temperature is elevated above the Tg or Tm, the storage modulus usually decreases and the adhesive become tacky. Tg or Tm is typically measured by DSC.

Laminating adhesives (also sometimes referred to as contact adhesives) are adhesives designed to form bonds to two substrates immediately after dispensing. Once the adhesive has been dispensed, there is a limited time, sometimes referred to as "open time" in which the adhesive can form a bond to two substrates. Once the open time has elapsed, the laminating adhesive is no longer capable of forming adhesive bonds. Examples of laminating adhesives are hot melt adhesives, solutions or dispersions of polymeric materials or materials curable to form polymeric materials in a liquid medium, and curable adhesives. The laminating adhesive is coated onto a substrate, a second substrate is contacted to the adhesive surface and the formed three layer construction is cooled, dried, and/or cured to form a laminate. Examples of laminating adhesives include the glue sticks used in hot glue guns (which are hot melt types of adhesives that form bonds upon cooling), casein glues, sometimes called "white glue", (which are water-borne dispersions that form bonds upon drying), and cyanoacrylate adhesives (which cure to form bonds upon exposure to air).

Unless otherwise indicated, the terms "transparent" and "optically transparent" are used interchangeably and refer to an article, film or adhesive that has a high light transmittance over at least a portion of the visible light spectrum (about 400 to about 700 nm). By high light transmittance over at least a portion of the visible light spectrum it is meant at least 50% transmittance, in some embodiments at least 70% transmittance, or even greater than 90% transmittance.

As used herein, the term "polymer" refers to a polymeric material that is a homopolymer or a copolymer. As used herein, the term "homopolymer" refers to a polymeric material that is the reaction product of one monomer. As used herein, the term "copolymer" refers to a polymeric material that is the reaction product of at least two different monomers.

As used herein the terms "thermoplastic", "non-thermoplastic", and "thermoset", refer to properties of materials. Thermoplastic materials are materials which melt and/or flow upon the application of heat, resolidify upon cooling and again melt and/or flow upon the application of heat. The thermoplastic material undergoes only a physical change upon heating and cooling, no appreciable chemical change occurs. Non-thermoplastic materials are materials that do not flow upon the application of heat up to a temperature where the material begins to degrade. Thermoset materials, are curable materials that irreversibly cure, such as becoming crosslinked, when heated or cured. Once cured, the thermoset material will not appreciably melt or flow upon application of heat.

Disclosed herein are methods of preparing retroreflective articles. These methods comprise providing a polymeric carrier layer with a first major surface and a second major surface, providing transparent microspheres, partially embedding the transparent microspheres into the first major surface of the polymeric carrier layer such that the beads at least partially protrude from the first major surface of the polymeric carrier layer to form a layer of microspheres, depositing a transparent polymeric layer on the layer of microspheres, depositing a first reflective layer on at least a portion of the first major surface of the polymeric carrier layer and the layer of microspheres, depositing a second reflective layer on at least a portion of the first major surface of the polymeric carrier layer and the layer of microspheres, applying a bead bond layer containing a colorant to the layer of microspheres, and removing the polymeric carrier layer.

In some embodiments, depositing a first reflective layer on at least a portion of the first major surface of the polymeric carrier layer and the layer of microspheres comprises depositing a layer of reflective metal to a selected portion of the layer of microspheres. This selective deposition can be achieved in a variety of ways, for example, portions of surface can be masked to prevent the deposition of the metal in the masked regions. The region of selective deposition comprises a segment in the final retroreflective article. When the depositing of a reflective layer (whether a reflective metal layer or a reflective dielectric layer) is said to be deposited on the layer of transparent microspheres, of course the deposition is occurring not directly on the transparent microspheres but on the transparent polymeric layer that is covering the transparent microspheres. Since a region of selective deposition refers to the microspheres of that region, the deposition is described as being on the microspheres, with the understanding that the transparent polymeric layer is present on the microspheres.

After the selective deposition of a layer of reflective metal, depositing the second reflective layer on at least a portion of the first major surface of the polymeric carrier layer and the layer of microspheres comprises depositing a layer of dielectric material to the entire layer of microspheres. In these embodiments, a selective region has a reflective metal layer, and the entire microsphere layer has a reflective dielectric layer.

In other embodiments, depositing a first reflective layer on at least a portion of the first major surface of the polymeric carrier layer and the layer of microspheres comprises depositing a layer of dielectric material to the entire layer of microspheres. After this non-selective deposition, depositing the second reflective layer on at least a portion of the first major surface of the polymeric carrier layer and the layer of microspheres comprises depositing a layer of reflective metal to a selected portion of the layer of microspheres. This selective deposition can be achieved in a variety of ways as will be discussed below. The region of selective deposition comprises a segment in the final retroreflective article.

A wide variety of materials are suitable for use in the methods described above. Examples of these materials are described below.

A wide variety of materials and combinations of materials are suitable for the polymeric carrier layer. In many embodiments the polymeric carrier layer is a thermoplastic polymeric carrier layer, but in other embodiments the polymeric carrier layer may comprise an elastomeric polymeric carrier layer, and in some embodiments may even be a pressure sensitive adhesive or a heat activated adhesive. Typically the polymeric carrier layer comprises a thermoplastic polymeric carrier layer. In some embodiments, the thermoplastic polymeric carrier layer may be a standalone layer; in other embodiments the thermoplastic polymeric carrier layer may comprise a coating of thermoplastic polymeric carrier material on the first major surface of a sheet. The sheet may comprise, for example, paper, a polymeric film, and the like. Examples of useful polymeric carrier materials include polyvinyl chloride, polysulfones, polyalkylenes such as polyethylene, polypropylene and polybutylene, polyesters, and the like.

A layer of partially embedded transparent microspheres is formed on the surface of the polymeric carrier layer. The monolayer of transparent microspheres is assembled by cascading transparent microspheres onto polymeric carrier layer, which secures the microspheres in a desired temporary assignment. Typically, the polymeric carrier layer is heat softened. The microspheres are generally packed as closely as possible, ideally in their closest hexagonal arrangement, to achieve very good retroreflective brightness and may be so arranged by any convenient application process, such as printing, screening, cascading, or hot rolling. Upon cooling, the polymeric carrier layer retains the microspheres in a desired arrangement.

Typically, the transparent microspheres are substantially spherical in shape in order to provide the most uniform and efficient retroreflection. The microspheres are substantially transparent so as to minimize absorption of light so that a large percentage of the incident light is retroreflected. The microspheres often are substantially colorless but may be tinted or colored in some other fashion.

The microspheres may be made from glass, a non-vitreous ceramic composition, or a synthetic resin. Glass and ceramic microspheres are particularly suitable because they tend to be harder and more durable than microspheres made from synthetic resins. Examples of microspheres that may be used are described in the following U.S. Pat. Nos. 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414.

The microspheres typically have an average diameter in the range of about 30 to 200 micrometers. Microspheres smaller than this range tend to provide lower levels of retroreflection, and microspheres larger than this range may impart an undesirably rough texture to the appliqué or may undesirably reduce its flexibility. The microspheres typically have a refractive index of about 1.7 to about 2.0, the range typically considered to be useful in exposed lens retroreflective products.

The retroreflective articles of this disclosure also include a transparent polymeric layer. This polymer layer covers the regions between the transparent microspheres and the reflective layer and also typically covers the regions that are between the transparent microspheres. Thus this transparent polymeric layer, in regions between the transparent microspheres, is exposed to the ambient atmosphere in the final article. The transparent polymeric layer forms a protective layer, either between the transparent microspheres and the reflective layer or layers, or between the reflective layer and the ambient atmosphere. In addition to acting as a protective layer, in the sections where the reflective layer is a multi-layer dielectric reflecting layer, the transparent polymeric layer, because it has a refractive index in the range of low refractive index materials suitable for use in multi-layer dielectric reflecting layers, can function as part of the multi-layer dielectric mirror. In other words, the protective polymeric layer functions as a first layer of the multi-layer dielectric mirror. This feature is significant because the transparent polymeric layer is thus not an extra polymeric layer that the incident and reflected rays of light have to pass through, instead the transparent polymeric layer is part of the reflecting multi-layer dielectric mirror. This transparent polymeric layer may be a single layer or it may comprise a plurality of sublayers. Additionally, this transparent polymeric layer may contain one or more additives. Among suitable additives are dyes, pigments, UV stabilizers, antioxidants, UV absorbers, property modifiers, performance enhancers, or combinations thereof. Such additives can provide UV stability to enhance the color-fastness of the colored article, as well as improving the wash durability and flame retardancy.

In some embodiments, the transparent polymeric layer is a colored layer and contains dyes, pigments, or a combination thereof. Making this additional layer a colored layer can make the article more highly colored and thereby make it more visible in daylight. Suitable dyes and pigments include those described below as suitable for use in the colored bead bond layer. The amount of colored additives, if used, is at a sufficiently low level so as to not interfere with the retroreflectivity of the reflective layer.

A wide range of polymeric materials are suitable for preparing the transparent polymeric layer. The polymeric material may be a urethane material, urea material, ester material, epoxy material, carbonate material, (meth)acrylate material, olefinic material, vinyl chloride material, amide material, alkyd material, or combination thereof. The transparent polymeric material is typically a thin polymeric layer. Generally any layer thickness is suitable as long as the layer does not adversely affect the retroreflective properties of the article; typically the layer thickness is in the range of 0.01 micrometers to 10 micrometers.

As described above, two different reflective layers are applied to the microspheres, a reflective metal layer and a dielectric reflective layer.

The reflective metal layer is a specularly reflective metal that forms a reflective metal layer coating. This technique facilitates the arrangement of the retroreflective elements (optical elements and reflective material) in substantially uniform direction for retroreflection. The size of the retroreflective elements, i.e. the surface portion of the microspheres covered with the reflective material, may be controlled in part by controlling the depth to which the microspheres are embedded in the polymer prior to applying the reflective material.

The reflective material can be a layer comprising an elemental metal that is capable of specularly reflecting light. A variety of metals may be used to provide a specular reflective metal layer. These include aluminum, silver, chromium, gold, nickel, magnesium, and the like, in elemental form, and combinations thereof. Aluminum and silver are particularly suitable metals for use in a reflective layer from a performance standpoint. The metal may be a continuous coating such as is produced by vacuum-deposition, vapor coating, chemical-deposition, or electroless plating. It is to be understood that in the case of aluminum, some of the metal may be in the form of the metal oxide and/or hydroxide. Aluminum and silver metals are desirable because they tend to provide the highest retroreflective brightness. The metal layer should be thick enough to reflect incoming light. Typically, the reflective metal layer is about 50 to 150 nanometers thick.

The dielectric reflective layer is a dielectric mirror. The dielectric mirror may be similar to known dielectric mirrors disclosed in U.S. Pat. Nos. 3,700,305 and 4,763,985 to Bingham. The dielectric mirrors typically are multi-layer constructions, with a layer having a refractive index $n_2$ and a layer of transparent material disposed thereon which has a refractive index $n_1$, and the opposite face of the transparent material (having a refractive index $n_1$) is in contact with a material having a refractive index $n_3$, where both $n_2$ and $n_3$ have a refractive index of at least 0.1, more typically at least 0.3, higher or lower than $n_1$. The transparent material is a layer that typically has an optical thickness corresponding to odd numbered multiples (that is, 1, 3, 5, 7 . . . ) of about one-quarter wavelength of light in the wavelength range of about 380 to about 1,000 nanometers. Thus, either $n_2>n_1<n_3$ or $n_2<n_1>n_3$, and the materials on either side of the transparent layer may be either both higher or both lower in refractive index than $n_1$. When $n_1$ is higher than both $n_2$ and $n_3$, $n_1$ is in the 1.7 to 4.9 range, and $n_2$ and $n_3$ are in the 1.2 to 1.7 range. Conversely, when $n_1$ is lower than both $n_2$ and $n_3$, $n_1$ is in the 1.2 to 1.7 range, and $n_2$ and $n_3$ are in the 1.7 to 4.9 range. The dielectric mirror generally comprises a contiguous array of materials, at least one being in layer form, having an alternating sequence of refractive indices. Typically, the contiguous array has from two to seven layers, more typically three to five layers, adjacent to the lens element. A dielectric mirror can provide very good retroreflectivity, although, it typically is not as efficient a reflector as a reflective metal layer.

Among the many compounds that may be used in providing transparent materials within the desired refractive index range are: high index materials such as CdS, $CeO_2$, CsI, GaAs, Ge, InAs, InP, InSb, $Nb_2O_5$, $ZrO_2$, $Bi_2O_3$, ZnSe, ZnS, $WO_3$, PbS, PbSe, PbTe, RbI, Si, $Ta_2O_5$, Te, $TiO_2$; low index materials such as $Al_2O_3$, $AlF_3$, $CaF_2$, $CeF_3$, LiF, $MgF_2$, $Na_3AlF_6$, $ThOF_2$, elastomeric copolymers of perfluoropropylene and vinylidene fluoride (refractive index of >>1.38), etc. Other materials are reported in Thin Film Phenomena, K. L. Chopra, page 750, McGraw-Hill Book Company, N.Y., (1969). Particularly suitable dielectric mirrors contain layers of $SiO_2$, $Na_3AlF_6$, cryolite, $CaF_2$, $MgF_2$, ZnS, $Nb_2O_5$, $TiO_2$, $Ta_2O_5$, $ZrO_2$, or combinations thereof. In some embodiments, the dielectric reflective layer comprises a layer of $CaF_2$, ZnS, or a combination thereof.

The bead bond layer containing a colorant, also called a colored bead bond layer, typically contains a flexible polymeric binder material that is colored in some fashion. The colored bead bond layer also may contain such optional additives such as UV stabilizers, antioxidants, UV absorbers, property modifiers, performance enhancers, or combinations thereof. Generally, the colored bead bond layer contains from about 70 weight percent up to about 99 weight percent of a polymeric binder material with the remainder being optional additives in effective amounts.

The polymeric binder material of the colored bead bond layer may be a polymer including, but not limited to, an elastomer. In this disclosure, an elastomer is defined as a polymer having an ability to be stretched to at least twice its original length and to retract to approximately its original length when released, (definition taken from "Hawley's Condensed Chemical Dictionary", R. J. Lewis Sr. Ed., 12th Ed., Van Nostrand Reinhold Co., New York, N.Y. (1993)). Typically, the polymeric binder material includes a cross-linked or virtually cross-linked elastomer. A cross-linked elastomer means that the polymeric chains of the elastomer are chemically cross-linked to form a three dimensional network which is stabilized against molecular flow. A virtually cross-linked elastomer means that the polymeric chain mobility of the elastomer is greatly reduced by chain entanglement and/or by hydrogen bonding, resulting in an increase in the cohesive or internal strength of the polymer. Examples of such polymer cross-linking include carbon-carbon bond formation such as: free radical bonding between vinyl groups between chains; agent or group coupling such as by vulcanization or reaction with a coupling agent such as a diol in the case of isocyanate or epoxy functionalized polymers; a diisocyanate or an activated ester in the case of amine and alcohol functionalized polymers; and epoxides and diols in the case of carboxylic acid or anhydride functionalized polymers. Examples of such virtual cross-linking include amide hydrogen bonding as is found in polyamides or crystalline and amorphous region interactions as is found in block copolymers of styrene and acrylonitrile.

Illustrative examples of the polymers that may be employed as the binder material in the colored bead bond layer include: polyolefins; polyesters; polyurethanes; polyepoxides; natural and synthetic rubbers; and combinations thereof. Examples of cross-linked polymers include the foregoing examples of polymers substituted with cross-linkable groups such as epoxide groups, olefinic groups, isocyanate groups, alcohol groups, amine groups or anhydride groups. Multifunctional monomers and oligomers which react with functional groups of the polymers may also be used as cross-linkers.

Specific examples of useful bead bond layer materials are disclosed in U.S. Pat. Nos. 5,200,262 and 5,283,101. In the '262 patent, the bead bond layer comprises one or more flexible polymers having active hydrogen functionalities such as crosslinked urethane-based polymers (for example, isocyanate cured polyesters or one of two component polyurethanes) and one or more isocyanate-functional silane coupling agents. In the '101 patent, the bead bond layer comprises an electron-beam cured polymer selected from the group consisting of chlorosulfonated polyethylenes, ethylene copolymers comprising at least about 70 weight percent polyethylene, and poly(ethylene-co-propylene-co diene) polymers.

Examples of commercially-available polymers that may be used in the colored bead bond layer include the following: VITEL 3550 and VITEL 5833 polyesters available from Bostik, Wauwatosa, Wis.; RHOPLEX HA-8 and NW-1845 acrylic resins available from Dow Chemical; CYDROTHANE a polyurethane available from Cytec Industries, West Patterson, N.J.; ESTANE 5703 and 5715 available from Lubrizol Corp., Cleveland, Ohio; and NIPOL 1000, available from Zeon Chemicals, Inc., Louisville, Ky.

The colored bead bond layer typically has a thickness of about 50 to 250 micrometers (2 to 10 mils), with thicknesses of about 75 to 200 micrometers (3 to 8 mils) often being particularly suitable. It is to be understood that a colored bead bond layer having a thickness outside these ranges may be used; however, if the bead bond layer is too thin, it may not provide sufficient support to the microspheres, allowing them to become dislodged.

The bead bond layer is colored by incorporating a dye, a pigment or a combination of dye and pigment therein. Examples of suitable dyes and pigments include those included in the following table:

| Color Index Name | Color Index Number | Company Order Number | Company |
| --- | --- | --- | --- |
| Yellow 16 | 12,700 | SUDAN YELLOW 146 | BASF, Florham Park, NJ |
| Yellow 56 | 11,021 | SUDAN YELLOW 150 | BASF, Florham Park, NJ |
| Red 1 | 12,150 | SUDAN RED 290 | BASF, Florham Park, NJ |
| Blue 35 | 61,554 | SUDAN BLUE 35 | BASF, Florham Park, NJ |
| Pigment Yellow 83 | 21,108 | 275-0570 | Sun Chemical, Parsippany, NJ |
| Pigment Yellow 17 | 21,105 | 275-0023 | Sun Chemical, Parsippany, NJ |

In some embodiments, the colorant is a highly visible fluorescent dye and/or pigment. Fluorescent dyes and/or pigments can provide enhanced conspicuity under daytime lighting conditions. Examples of fluorescent dyes or pigments that may be used to color the bead bond layer, include: DAY-GLO FIRE ORANGE T-14, ROCKET RED GT, BLAZE ORANGE GT, and SATURN YELLOW T-17, from Day-Glo Color Corp., Cleveland, Ohio; FLARE 911 from Cleveland Pigment & Color Co., Akron, Ohio; LUMOGEN F RED 300, F YELLOW 083, and YELLOW S0790 (PIGMENT YELLOW 101, C.I. No. 48052), BASF Corporation, Florham Park, N.J.

A pigment can be any material that is capable of changing the color of reflected or transmitted light as the result of wavelength-selective adsorption. Any colored pigment can be utilized in retroreflective articles as disclosed herein. In embodiments, the pigment can be a nanopigment. A nanopigment is a pigment that generally has an average particle size in the nanometer range. In embodiments, a nanopigment can have an average particle size from about 1 nm to about 1000 nm. Nanopigments can be useful because of the interaction of light with them; light will diffract from nanopigments because of their size, which can contribute to high reflectivities. In embodiments, a nanopigment can have an average particle size from about 50 nm to about 500 nm. An exemplary nanopigment that can be utilized includes CABOJET 300, which is commercially available from Cabot Corporation (Boston, Mass.).

In some embodiments, the colored layer can include both nanopigments and other sized pigments (which can be referred to herein as "normal pigments"). Normal pigments can generally have average particle sizes from about 1 micrometer to about 40 micrometers. In embodiments, normal pigments can have average particle sizes from about 1 micrometer (1000 nm) to about 10 micrometers. In embodiments that include both nanopigments and normal pigments, the nanopigments can account for at least about 5 percent of the total pigment by weight. In embodiments that include both nanopigments and normal pigments, the nanopigments can account for at least about 10 percent of the total pigment by weight. In some embodiments, the colored layer includes both pigments and dyes, such as both nanopigments and dyes for example.

The colored layer generally includes a desirable amount of pigment to provide a desired color or depth of color of the colored layer or article. The amount of pigment in the colored layer can depend at least in part on the particular pigment(s) utilized, the desired color or shade of color, the other components in the colored layer, and combinations thereof. In embodiments, the colored layer can have 0.1 to 70 percent pigment, by weight of solids in the colored layer; from 1 to 40 percent pigment, by weight of solids in the colored layer; or from 5 to 35 percent pigment, by weight of solids in the colored layer.

The above methods can be used to prepare a wide variety of retroreflective articles. Disclosed herein are retroreflective articles that comprise a layer of optical elements divided into at least a first segment and a second segment. The optical elements are transparent microspheres, a transparent polymeric layer, and at least one reflective layer. The optical elements are embedded in a bead bond layer, where the bead bond layer includes a colorant. In the first segment of optical elements, the reflective layer comprises a dielectric reflective layer, and in the second segment of optical elements, the reflective layer comprises a reflective metallic layer. In some embodiments, the reflective layer in the second segment of optical elements comprises both a reflective metal layer and a dielectric reflective layer.

Also disclosed are retroreflective articles that comprise a third segment of optical elements, wherein in the third segment of optical elements, the reflective layer comprises a dielectric layer. In some of these embodiments, the segments are arranged in a pattern with the sequence: first segment, second segment, third segment.

Besides the properties of retroreflectivity and high daylight visibility, the retroreflective articles of this disclosure have a variety of other desirable properties. Among these properties are wash durability, flame retardancy, and color-fastness of the colored bead bond layer.

By wash durability it is meant that the retroreflective articles of this disclosure are capable of being laundered without losing the desired properties of the article, namely retroreflectivity and high daylight visibility. Wash durability of retroreflective articles can be described in a variety of different ways. An example of good washing performance was described in US Patent Publication No. 2011/0292508 (Huang et al.), as retaining at least about 100 candelas/lux/meter$^2$ at 5/0.2 angle after being washed 15 times. In some embodiments, the retroreflective article can retain at least about 200 candelas/lux/meter$^2$ at 5/0.2 angle after being washed 15 times. In yet other embodiments, the retroreflective article can retain at least about 300 candelas/lux/meter$^2$ at 5/0.2 angle after being washed 15 times.

By flame retardant it is meant that the retroreflective articles of this disclosure are resistant to heat and flames. The articles of this disclosure can be exposed to heat or flames without losing the desired properties of the article, namely retroreflectivity and high daylight visibility. A number of flame retardancy regulatory standards are known and used in the industry, such as for example, the NFPA 1971 Standard on Protective Ensembles for Structural Fire Fighting and Proximity Fire Fighting. Testing involves high temperature soaking and vertical flame tests. The main performance criteria are the absence of materials ignition, melting, dripping, and layer separation. Flame retardancy is a feature that is particularly desirable in applications where heat and flames are likely to be encountered by the articles, such as on articles of clothing to be worn by firefighters.

By the bead bond layer being color-fast, it is meant that the color of the bead bond layer does not fade with time or upon exposure to the environment or upon being washed. Color-fastness criteria are described, for example, in high-visibility safety garment regulatory standards such as ISO 20471 and ANSI/ISEA 107-2010, and include conditions such as ironing, dry cleaning, dry and wet rub washing, and solar exposure.

In some embodiments, it is desirable that the retroreflective articles have at least one of the first and second segments (and optionally additional segments if present) be discontinuous. By discontinuous it is meant that there is a region in the segment that is devoid of microspheres and bead bond layer. These discontinuities can be beneficial for a variety of reasons. In some embodiments, the discontinuities can form a pattern or design. The pattern or design can be in the form of indicia, logos, etc. In other embodiments, the discontinuities can be arranged either randomly or in a non-continuous pattern. Besides the visual effect of the discontinuities, the discontinuities can provide enhanced breathability for the retroreflective article. By this it is meant that gases, and or moisture can pass through the retroreflective article more easily. An effect of the enhanced breathability is to be more comfortable for a person wearing such an article. This is particularly desirable for construction workers, firefighters, emergency workers, and people exercising. Examples of various designs of retroreflective articles having discontinuous segments can be seen FIGS. 2-5 of U.S. Pat. No. 8,256,025.

Retroreflective articles with discontinuous segments can be prepared a variety of different ways. A particularly suitable way involves partially removing optical elements and bead bond layer from portions of one or more segments. This removal can be effected by cutting, scraping, hole-punching, and other suitable mechanical means.

Examples of articles of this disclosure are provided in the Figures. FIG. 1 is a cross sectional depiction of an embodiment of this disclosure. In FIG. 1, three segments are shown, 110, 120, and 130. Segments 110 and 130 are similar in that they contain transparent microspheres 140 and dielectric reflective layer 150. Segment 120 on the other hand comprises, not only transparent microspheres 140 and dielectric reflective layer 150, but also metallic reflective layer 160 located between the transparent microspheres 140 and dielectric reflective layer 150. Transparent polymeric layer 180 is located between the reflective layers 150 or 160 and transparent microspheres 140. Polymer layer 180, as described above, may be a single layer polymer layer, or a multi-layer polymer layer, and it may be contain a variety of additives. The thickness of the transparent polymer layer 180 does not need to be and typically is not, the same in the areas in contact with transparent microspheres 140, as in the areas between the transparent microspheres. Bead bond layer 170 comprises a colored bead bond layer. FIG. 1 is indicative of an embodiment in which transparent polymeric layer 180 is applied to the layer of transparent microspheres 140, the metallic reflective layer 160 is selectively applied to segment 120, and then continuous dielectric layer 150 is applied, followed by the application of bead bond layer 170.

Figure 2:
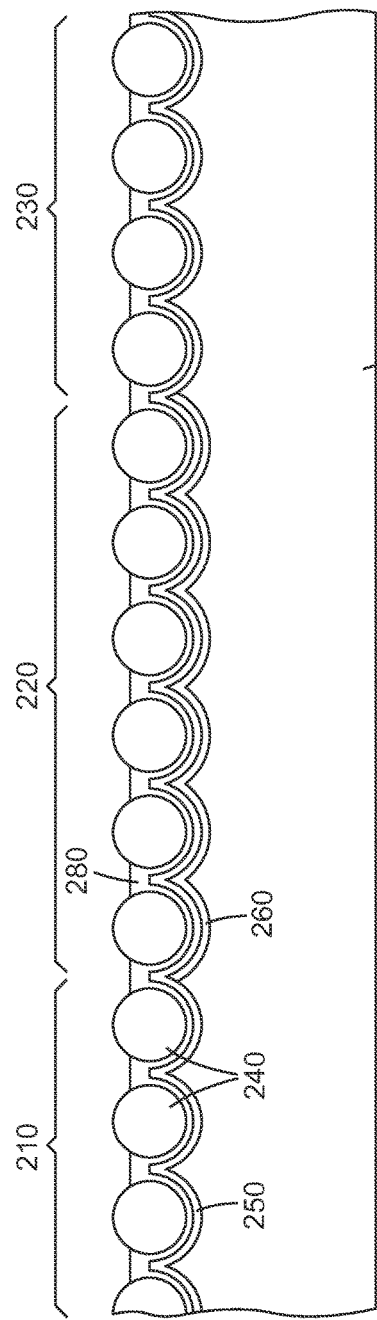
FIG. 2 shows a cross-sectional view of an embodiment of an article of this disclosure.

FIG. 2 depicts an alternative embodiment of this disclosure. In FIG. 2, three segments are shown, 210, 220, and 230. Segments 210 and 230 are similar in that they contain transparent microspheres 240 and dielectric reflective layer 250. Segment 220 on the other hand comprises, not only transparent microspheres 240 and dielectric reflective layer 250, but also metallic reflective layer 260 located on dielectric reflective layer 250. Transparent polymeric layer 280 is located between the reflective layer 250 and transparent microspheres 240. Polymer layer 280, as described above, may be a single layer polymer layer, or a multi-layer polymer layer, and it may be contain a variety of additives. Bead bond Bead bond layer 270 comprises a colored bead bond layer. FIG. 2 is indicative of an embodiment in which transparent polymeric layer 280 is applied to the layer of transparent microspheres 240, continuous dielectric layer 250 is applied, and then the metallic reflective layer 260 is selectively applied, followed by the application of bead bond layer 270.

Figure 3:
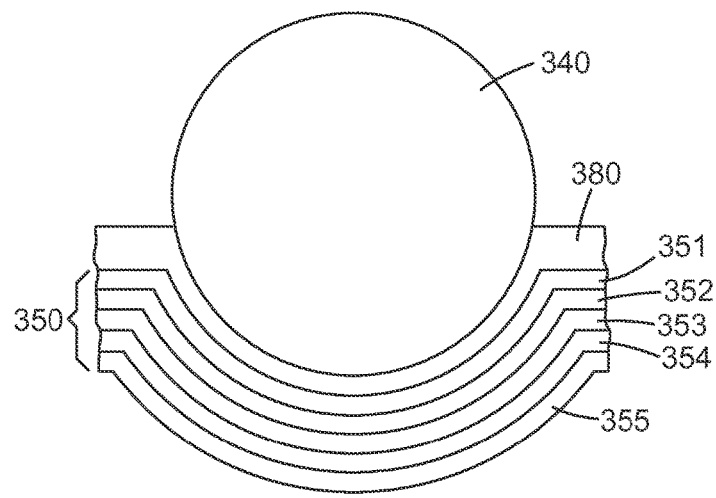
FIG. 3 shows a cross-sectional view of a single bead of the article of FIG. 1.

FIG. 3 depicts an enlarged view of a single bead from segment 110 or 130 of FIG. 1. FIG. 3 shows transparent microsphere 340, transparent polymeric layer 380, and continuous dielectric layer 350. This enlarged view shows that layer 350 comprises a series of sublayers, 351, 352, 353, 354, and 355. Dielectric layer 350 may comprise additional sublayers (not shown).

Figure 4:
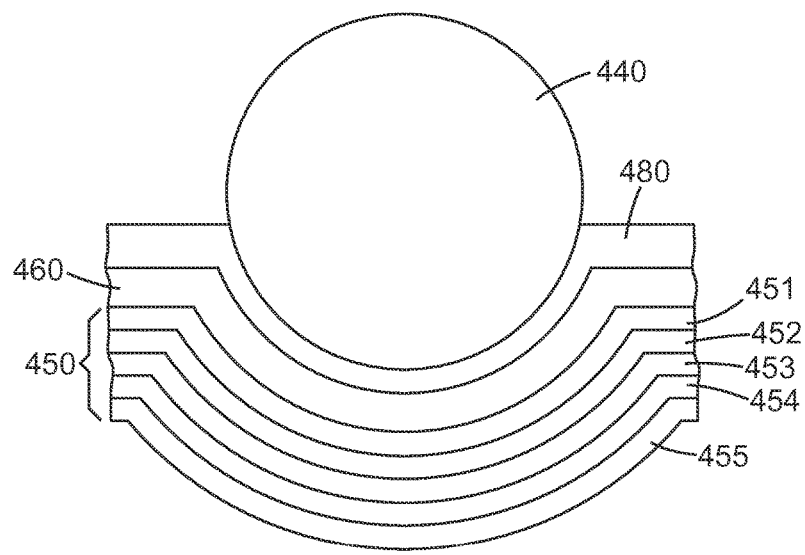
FIG. 4 shows a cross-sectional view of a single bead of the article of FIG. 1.

FIG. 4 depicts an enlarged view of a single bead from segment 120 of FIG. 1. FIG. 4 shows transparent microsphere 440, transparent polymeric layer 480, metallic reflective layer 460, and continuous dielectric layer 450. This enlarged view shows that layer 450 comprises a series of sublayers, 451, 452, 453, 454, and 455. Dielectric layer 450 may comprise additional sublayers (not shown).

Figure 5:
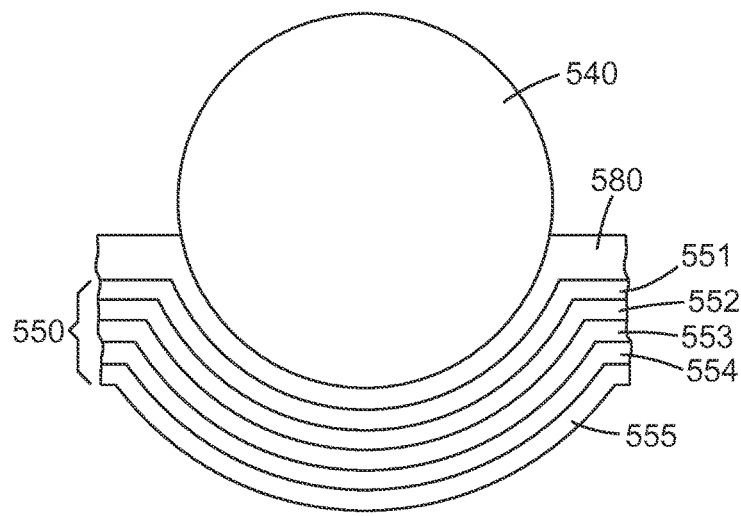
FIG. 5 shows a cross-sectional view of a single bead of the article of FIG. 2.

FIG. 5 depicts an enlarged view of a single bead from segment 210 or 230 of FIG. 2. FIG. 5 shows transparent microsphere 540, transparent polymeric layer 580, and continuous dielectric layer 550. This enlarged view shows that layer 550 comprises a series of sublayers, 551, 552, 553, 554, and 555. Dielectric layer 550 may comprise additional sublayers (not shown).

Figure 6:
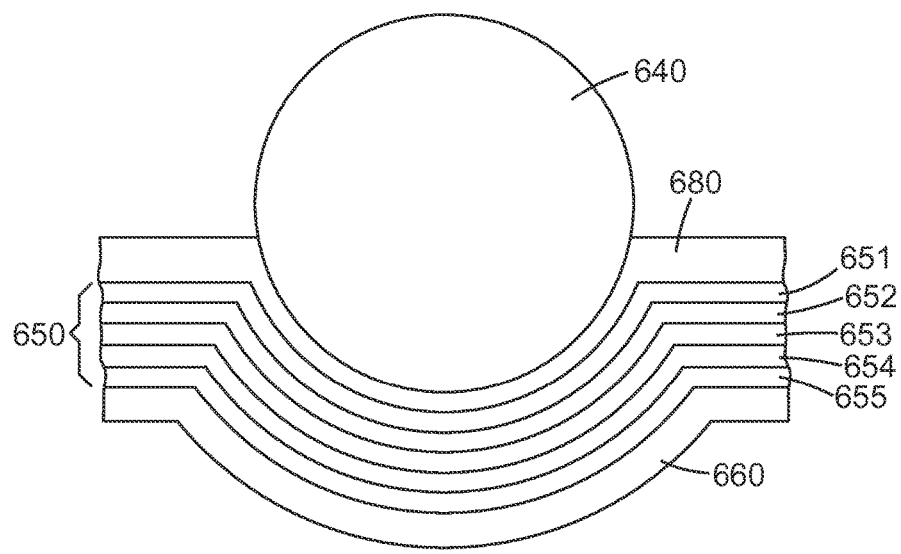
FIG. 6 shows a cross-sectional view of a single bead of the article of FIG. 2.

FIG. 6 depicts an enlarged view of a single bead from segment 220 of FIG. 2. FIG. 6 shows transparent microsphere 640, transparent polymeric layer 680, metallic reflective layer 660, and continuous dielectric layer 650. This enlarged view shows that layer 650 comprises a series of sublayers, 651, 652, 653, 654, and 655. Dielectric layer 650 may comprise additional sublayers (not shown).

Figure 7:
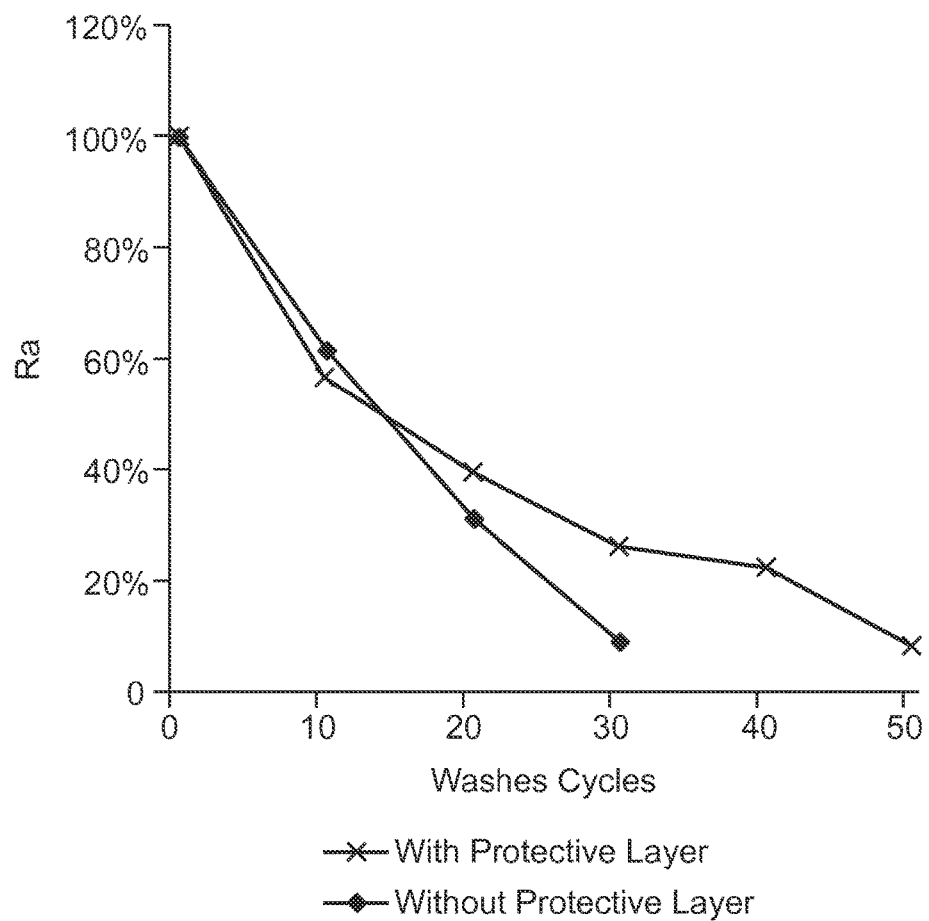
FIG. 7 shows a graphical representation of wash cycle data for a comparative example and an example of an article of this disclosure.

FIG. 7 shows a plot of the percent of retroreflective retention as a function of the number of wash cycles for a comparative example without a transparent polymeric layer and for an embodiment of this disclosure with a transparent polymeric layer. This plot is explained in greater detail in the Examples section below.

Also disclosed herein are a variety of intermediate articles. By intermediate articles it is meant articles in which the polymeric carrier layer is attached to the article. The intermediate articles are not themselves retroreflective articles, but become retroreflective articles upon the removal of the polymeric carrier layer.

The intermediate articles include articles comprising a polymeric carrier layer with a first major surface and a second major surface, a layer of optical elements, partially embedded in the first major surface of the polymeric carrier layer, and a bead bond layer comprising a colorant. The optical elements comprise transparent microspheres, a transparent polymeric layer, and at least one reflective layer. The layer of optical elements is divided into at least a first segment and second segment, where in the first segment of optical elements, the reflective layer comprises a dielectric reflective layer, and in the second segment of optical elements, the reflective layer comprises a reflective metallic layer.

The intermediate article can be immediately subjected to addition steps to generate the final retroreflective article, or the intermediate article can be stored for later use, shipped to another location, or subjected to additional processing steps such as cutting, attachment to a substrate, and the like. It is desired to form this intermediate article, because this intermediate article can be stored, shipped, or processed without exposing the optical elements. Once the optical elements are exposed, even though they contain a protective transparent polymeric layer, they are subject to potential damage from abrasion, staining and the like. When desired, the polymeric carrier layer is removed to form the final retroreflective article.

Figure 8:
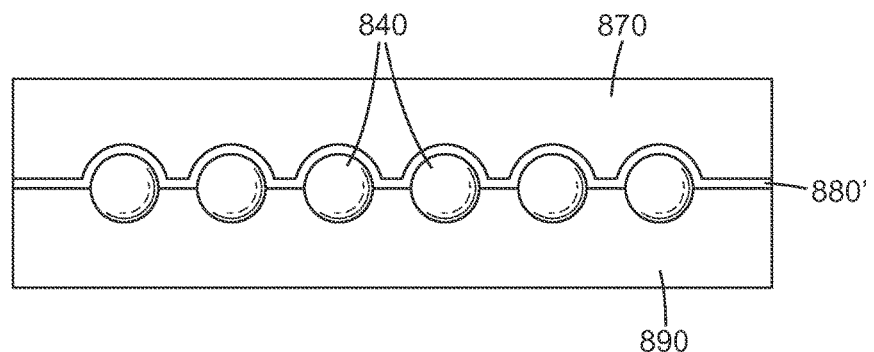
FIG. 8 shows a cross-sectional view of an embodiment of an intermediate article of this disclosure.

FIG. 8 depicts an intermediate article of this disclosure. In FIG. 8, the intermediate article includes transparent microspheres 840, layer 880', bead bond layer 870, and polymeric carrier layer 890. For simplicity, layer 880' is used to designate the transparent polymeric layer or layers as well as the reflective layers (either a reflective metal layer or a multi-layer dielectric reflecting layer or a combination thereof).

Figure 9:
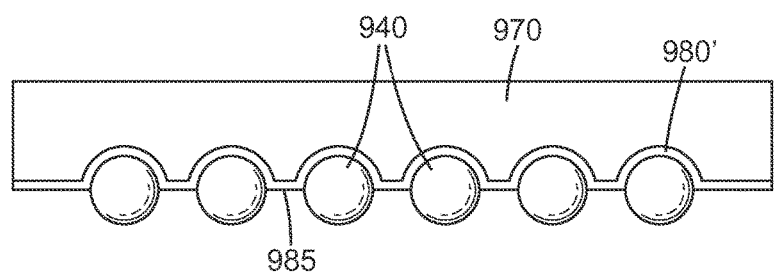
FIG. 9 shows a cross-sectional view of an article of this disclosure.

FIG. 9 depicts the final reteroreflective article formed when the polymeric carrier layer is removed from the article of FIG. 8. In FIG. 9, the article includes transparent microspheres 940, layer 980', and bead bond layer 970. The polymeric carrier layer 890 of the article of FIG. 8 has been removed. Layer 980' is used to designate the transparent polymeric layer or layers as well as the reflective layers (either a reflective metal layer or a multi-layer dielectric reflecting layer or combination thereof) and the exposed surface of layer 980', shown as 985, comprises the transparent polymeric layer.

Also disclosed herein are articles of clothing that contain retroreflective appliqués. These articles of clothing comprise a fabric with a first major surface and a second major surface, and a retroreflective appliqué attached to the first major surface of the fabric. The retroreflective appliqué is the retroreflective article described above. A wide variety of fabrics are suitable.

The retroreflective appliqué can be attached to the fabric surface by a wide range of attachment techniques such as mechanical attachment or adhesive attachment. Examples of mechanical attachment techniques include, for example, sewing and heat lamination. In adhesive attachment, an adhesive can be applied to the bead bond layer or a backing layer can be applied to the bead bond layer and an adhesive layer applied to the backing layer.

Examples of suitable adhesive layers include pressure sensitive adhesives, heat activated adhesives, and laminating adhesives. The adhesive layer may be applied to the bead bond layer or backing layer by coating or by lamination of a formed adhesive layer to the bead bond layer or backing layer.

A wide variety of pressure sensitive adhesives are suitable including tackified natural rubbers, synthetic rubbers, tackified styrene block copolymers, polyvinyl ethers, poly (meth) acrylates, polyurethanes, polyureas, poly-alpha-olefins, and silicones. The pressure sensitive adhesive may be covered with a release liner to protect the adhesive prior to adhesion to a substrate.

Heat activated adhesives are very similar to pressure sensitive adhesives but require the application of heat to become tacky. One advantage of heat activated adhesives is that, because they are not tacky at room temperature, they typically do not require a release liner to protect the adhesive layer prior to adhesion to a substrate.

Typically, if a laminating adhesive is used, the adhesive layer is immediately bonded to a substrate to form the adhesive substrate bond. Examples of laminating adhesives include hot melt adhesives, adhesive dispersions and suspensions, and curing adhesives such as cyanoacrylates.

A wide variety of articles of clothing are suitable for attachment of retroreflective appliqués. Examples of such articles of clothing include, for example, vests such as the safety vests frequently worn by road construction workers, but also include a wide range of other clothing types. Examples include shirts, sweaters, jackets, coats, pants, shorts, socks, shoes, gloves, belts, hats, suits, one-piece body garments, and the like.

This disclosure includes the following embodiments:

Among the embodiments are retroreflective articles. A first embodiment includes a retroreflective article comprising: a layer of optical elements, the layer of optical elements being divided into at least a first segment and second segment, and the optical elements comprising: transparent microspheres, a transparent polymeric layer, and at least one reflective layer; and a bead bond layer comprising a colorant, wherein the optical elements are partially embedded in the bead bond layer, and wherein in the first segment of optical elements, the reflective layer comprises a dielectric reflective layer, and in the second segment of optical elements, the reflective layer comprises a reflective metallic layer.

Embodiment 2 is the retroreflective article of embodiment 1, further comprising a third segment of optical elements, wherein in the third segment of optical elements, the reflective layer comprises a dielectric layer.

Embodiment 3 is the retroreflective article of embodiment 2, wherein the segments are arranged in a pattern with the sequence: first segment, second segment, third segment.

Embodiment 4 is the retroreflective article of any of embodiments 1-3, wherein the transparent polymeric layer has a thickness of from 0.01 to 10 micrometers.

Embodiment 5 is the retroreflective article of any of embodiments 1-4, wherein the transparent polymeric layer comprises a urethane material, a urea material, an ester material, an epoxy material, a carbonate material, a (meth) acrylate material, an olefinic material, a vinyl chloride material, an amide material, an alkyd material, or a combination thereof.

Embodiment 6 is the retroreflective article of any of embodiments 1-5, wherein the transparent polymeric layer comprises one or more additives, the additives comprising dyes, pigments, UV stabilizers, antioxidants, UV absorbers, property modifiers, performance enhancers, or combinations thereof.

Embodiment 7 is the retroreflective article of any of embodiments 1-6, wherein the bead bond layer comprising a colorant comprises a polymeric binder material and at least one dye, or at least one pigment, or a combination thereof.

Embodiment 8 is the retroreflective article of embodiment 7, wherein the bead bond layer comprising a colorant comprises at least one additive selected from UV stabilizers, antioxidants, UV absorbers, property modifiers, performance enhancers, or combinations thereof.

Embodiment 9 is the retroreflective article of embodiment 7, wherein the bead bond layer comprising a colorant comprises at least one fluorescent dye, or at least one fluorescent pigment, or a combination thereof.

Embodiment 10 is the retroreflective article of any of embodiments 1-9, wherein the reflective metal layer comprises a layer of layer of aluminum, silver, or a combination thereof.

Embodiment 11 is the retroreflective article of any of embodiments 1-10, wherein the dielectric reflective layer comprises a layer of $SiO_2$, $Na_3AlF_6$, cryolite, $CaF_2$, $MgF_2$, ZnS, $Nb_2O_5$, $TiO_2$, $Ta_2O_5$, $ZrO_2$, or combinations thereof.

Embodiment 12 is the retroreflective article of any of embodiments 1-11, wherein the dielectric reflective layer comprises a layer of $CaF_2$, ZnS, or a combination thereof.

Embodiment 13 is the retroreflective article of any of embodiments 1-12, wherein the article is wash durable.

Embodiment 14 is the retroreflective article of any of embodiments 1-13, wherein the article is flame retardant.

Embodiment 15 is the retroreflective article of any of embodiments 1-14, wherein the bead bond layer comprising a colorant is color-fast.

Embodiment 16 is the retroreflective article of any of embodiments 1-15, wherein at least one of the first and the second segments comprises a discontinuous segment.

Embodiment 17 is the retroreflective article of embodiment 16, wherein the discontinuous segments are formed by partially removing optical elements and bead bond layer from portions of the segment.

Also disclosed are articles of clothing. Embodiment 18 includes an article of clothing comprising: a fabric with a first major surface and a second major surface; and a retroreflective appliqué attached to the first major surface of the fabric, the retroreflective appliqué comprising: a layer of optical elements, the layer of optical elements being divided into at least a first segment and second segment, and the optical elements comprising: transparent microspheres, a transparent polymeric layer, and at least one reflective layer; and a bead bond layer comprising a colorant, wherein the optical elements are partially embedded in the bead bond layer, and wherein in the first segment of optical elements, the reflective layer comprises a dielectric reflective layer, and in the second segment of optical elements, the reflective layer comprises a reflective metallic layer.

Embodiment 19 is the article of clothing of embodiment 18, further comprising a third segment of optical elements, wherein in the third segment of optical elements, the reflective layer comprises a dielectric layer.

Embodiment 20 is the article of clothing of embodiment 19, wherein the segments are arranged in a pattern with the sequence: first segment, second segment, third segment.

Embodiment 21 is the article of clothing of any of embodiments 18-20, wherein the bead bond layer comprising a colorant comprises a polymeric binder material and at least one dye, or at least one pigment, or a combination thereof.

Embodiment 22 is the article of clothing of any of embodiments 18-21, wherein the bead bond layer comprising a colorant comprises at least one additive selected from UV stabilizers, antioxidants, UV absorbers, property modifiers, performance enhancers, or combinations thereof.

Embodiment 23 is the article of clothing of any of embodiments 18-22, wherein the bead bond layer comprising a colorant comprises at least one fluorescent dye, or at least one fluorescent pigment, or a combination thereof.

Embodiment 24 is the article of clothing of any of embodiments 18-23, wherein the retroreflective appliqué is attached to the first major surface of the fabric with a layer of adhesive.

Embodiment 25 is the article of clothing of any of embodiments 18-24, wherein the retroreflective appliqué is attached to the first major surface of the fabric by mechanical attachment.

Also disclosed are methods of preparing retroreflective articles. Embodiment 26 includes a method of preparing a retroreflective article comprising: providing a polymeric carrier layer with a first major surface and a second major surface; providing transparent microspheres; partially embedding the transparent microspheres into the first major surface of the polymeric carrier layer such that the beads at least partially protrude from the first major surface of the polymeric carrier layer to form a layer of microspheres; depositing a transparent polymeric layer on the layer of microspheres; depositing a first reflective layer on at least a portion of the first major surface of the polymeric carrier layer and the layer of microspheres; depositing a second reflective layer on at least a portion of the first major surface of the polymeric carrier layer and the layer of microspheres; applying a bead bond layer comprising a colorant to the layer of microspheres; and removing the polymeric carrier layer.

Embodiment 27 is the method of claim 26, wherein the polymeric carrier layer comprises a thermoplastic polymeric carrier layer.

Embodiment 28 is the method of claim 26 or 27, wherein depositing a first reflective layer on at least a portion of the first major surface of the polymeric carrier layer and the layer of microspheres comprises depositing a layer of reflective metal to a selected portion of the layer of microspheres.

Embodiment 29 is the method of embodiment 28, wherein depositing the second reflective layer on at least a portion of the first major surface of the polymeric carrier layer and the layer of microspheres comprises depositing a layer of dielectric material to the entire layer of microspheres.

Embodiment 30 is the method of any of embodiments 26-29, wherein depositing a first reflective layer on at least a portion of the first major surface of the polymeric carrier layer and the layer of microspheres comprises depositing a layer of dielectric material to the entire layer of microspheres.

Embodiment 31 is the method of embodiment 30, wherein depositing the second reflective layer on at least a portion of the first major surface of the polymeric carrier layer and the layer of microspheres comprises depositing a layer of reflective metal to a selected portion of the layer of microspheres.

Embodiment 32 is the method of any of embodiments 26-31, wherein the transparent polymeric layer has a thickness of from 0.01 to 10 micrometers.

Embodiment 33 is the method of any of embodiments 26-32, wherein the transparent polymeric layer comprises a urethane material, a urea material, an ester material, an epoxy material, a carbonate material, a (meth)acrylate material, an olefinic material, a vinyl chloride material, an amide material, an alkyd material, or a combination thereof.

Embodiment 34 is the method of any of embodiments 26-33, wherein the transparent polymeric layer comprises one or more additives, the additives comprising dyes, pigments, UV stabilizers, antioxidants, UV absorbers, property modifiers, performance enhancers, or combinations thereof.

Embodiment 35 is the method of any of embodiments 26-34, further comprising drying and/or curing of the transparent polymeric layer disposed on the transparent microspheres.

Also disclosed are intermediate articles. Embodiment 36 includes an article comprising: a polymeric carrier layer with a first major surface and a second major surface; a layer of optical elements, partially embedded in the first major surface of the polymeric carrier layer, the layer of optical elements being divided into at least a first segment and second segment, and the optical elements comprising: transparent microspheres, a transparent polymeric layer, and at least one reflective layer; and a bead bond layer comprising a colorant, wherein in the first segment of optical elements, the reflective layer comprises a dielectric reflective layer, and in the second segment of optical elements, the reflective layer comprises a reflective metallic layer.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted. The following abbreviations are used: nm=nanometers; mPa=milliPascals; psi=pounds per square inch; MPa=MegaPascals; min=minutes; mm=millimeters. The terms "weight %", "% by weight", and "wt %" are used interchangeably.

Table of Abbreviations

| Abbreviation or Trade Designation | Description |
| --- | --- |
| Disp-1 | Polyurethane waterborne dispersion, commercially available as "SANCURE 835" from Lubrizol, Cleveland, OH. |
| AP-1 | Adhesion Promoter-1, a secondary amino-functional ethoxysilane commercially available as "DYNASYLAN 1122" from Evonik Industries, Overland Park, KS. |
| Colorant | Commercially available as "GT-17-N SATURN YELLOW PIGMENT" from Day-Glo Color Corp., Cleveland, OH. |

-continued

Table of Abbreviations

| Abbreviation or Trade Designation | Description |
| --- | --- |
| PE-1 | A 50% solids polyester resin commercially available as "VITEL 3550 B" from Bostik Company, Wauwatosa, WI. |
| PE-2 | A polyester resin commercially available as "VITEL 5833" from Bostik Company, Wauwatosa, WI. |
| Silane | Commercially available as "SILQUEST A 1310" from Momentive Performance Materials, Strongsville, OH. |
| AP-2 | Adhesion Promoter-2, an epoxy-functional ethoxysilane commercially available as "SILQUEST A-1310" from Momentive Performance Materials, Albany, NY. |
| ISO | Aromatic Polyisocyanate, commercially available as "DESMODUR L75" from Bayer MaterialScience, Pittsburgh, PA. |
| DBTDL | Dibutyl tin dilaurate catalyst |
| MIBK | Methyl isobutyl ketone solvent |
| MEK | Methy ethyl ketone solvent |
| DAA | Diacetone Alcohol solvent |
| FR-1 | Flame Retardant-1, brominated flame retardant, commercially available as "SAYTEX 102E", Albemarle Corp., Baton Rouge, LA. |
| TPU-1 | Thermoplastic Polyurethane, commercially available as "ESTANE 5703" from Lubrizol, Cleveland, OH. |
| Ox-1 | Antimony Oxide |
| Ox-2 | Titanium Oxide |
| PUR | Polyurethane resin, commercially available as "MONDUR CB-75" from Mobay Chemical Co., Pittsburgh, PA. |

Synthesis Example S1: Preparation of Glass Bead Carrier Layer

A temporary glass bead carrier was prepared in a procedure as described in U.S. Pat. No. 5,474,827. A polyethylene layer was coated on a paper backing. The polyethylene layer was heated, and glass beads with diameter in the range of 40-90 micrometers were cascaded and sunk into the polyethylene. The sink depth was smaller than the glass beads diameter, and a portion of the microspheres remained exposed above the surface of the polyethylene.

Example 1 and Comparative Example C1

Retroreflective articles (Example 1 and Comparative Example C1) were prepared using the following multi-step procedure. The same procedure was followed for Example 1 and Comparative Example C1 with the exception that no protective coating layer was coated onto the glass bead layer for Comparative Example C1.

A protective coating solution was prepared by mixing together 1.5 grams of Disp-1, 0.03 grams of AP-1, and 61.0 grams of ethanol to form a 1% solids solution.

For Example 1, the coating solution prepared above was coated on the glass bead layer with a coating bar gap set at 51 micrometers (2 mils). The coating was dried at 65° C. (149° F.) for 3 min, followed by 90° C. (194° F.) for 2 min. (No protective coating was used in Comparative Example C1.)

The samples of glass bead layer (Comparative Example C1) or coated glass bead layer (Example 1) were vapor coated with a thin film dielectric stack consisting of alternating layers of ZnS and $CaF_2$ using an electron-beam evaporation method. The dielectric layers were deposited using a Temescal (Livermore, Calif.) electron beam gun in a Denton (Moorestown, N.J.) batch coater operating at a base pressure of approximately 0.5 mPa. The individual layer thickness was targeted at an optical quarter-wave at a reference wavelength of 550 nm. The corresponding physical thickness is given by t=550 nm/(4*n), where n is the respective refractive index at 550 nm. The refractive indices for each layer were determined by ellipsometry and spectrophotometry. For Example 1 a total of five quarter-wave layers (ZnS, CaF$_2$, ZnS, CaF$_2$, ZnS) were deposited. For Comparative Example C1, a six-layer thin film dielectric stack was deposited using the same process as outlined above, but deposited directly on the glass bead carrier in the following sequence: CaF$_2$, ZnS, CaF$_2$, ZnS, CaF$_2$, ZnS.

A colored bead bond composition was prepared as a 50% solids composition by mixing together the components shown in Table A.

TABLE A

| Component | Amount (parts by weight) |
| --- | --- |
| PE-1 | 60.6 |
| PE-2 | 10.88 |
| Silane | 1.21 |
| Colorant | 6.93 |
| ISO | 2.43 |
| DBTDL | 0.121 |
| MEK | 10.88 |
| MIBK | 6.93 |

After vapor coating, the samples were coated with the colored bead bond composition described above, followed by a thermal treatment for 30 seconds at 71° C. (160° F.), and for 3 min at 82° C. (180° F.).

The bead bond coated samples prepared above were laminated to an adhesive layer coated on an aramid fabric. The adhesive layer had a wet coating thickness of 0.23 mm (9 mils) with the composition shown in Table B. The lamination was performed at approximately 104° C. (220° F.) and 70 psi (482 MPa) pressure.

TABLE B

| Component | Amount (parts by weight) |
| --- | --- |
| MEK | 20.8 |
| DAA | 28.2 |
| FR-1 | 7.1 |
| TPU-1 | 14.3 |
| Ox-1 | 4.3 |
| Ox-2 | 23.3 |
| PUR | 2 |

Following the lamination process, the carrier layer was stripped away, exposing the previously embedded surfaces of the monolayer of glass microspheres to produce a colored reflective article.

Wash Durability Tests:

The samples of Example 1 and Comparative Example C1 were washed using the method ISO 6330 2A. The results are shown in Table 1 and FIG. 7. Example 1 shows higher retroreflectivity retention after washing due to more glass beads being retained in the article. In FIG. 7, Example 1 is described as "With Protective Layer" and Comparative Example C1 is described as "Without Protective Layer".

TABLE 1

| Number of Wash Cycles | % Retained Retroreflectivity | |
| --- | --- | --- |
| | C1 | Example 1 |
| 0 | 100 | 100 |
| 10 | 62 | 57 |
| 20 | 32 | 40 |
| 30 | 10 | 27 |
| 40 | — | 23 |
| 50 | — | 9 |

What is claimed is:

1. A retroreflective article comprising:
   a layer of optical elements, the layer of optical elements being divided into at least a first segment and second segment, and the optical elements comprising:
   transparent microspheres, a transparent polymeric layer, and at least one reflective layer; and
   a bead bond layer comprising a colorant, wherein the optical elements are partially embedded in the bead bond layer, and wherein the first segment of optical elements and the second segment of optical elements are defined by the reflective layer of those segments, such that in the first segment of optical elements, the reflective layer consists essentially of a dielectric reflective layer, and in the second segment of optical elements, the reflective layer comprises a reflective metallic layer.

2. The retroreflective article of claim 1, further comprising a third segment of optical elements, wherein in the third segment of optical elements, the reflective layer comprises a dielectric layer.

3. The retroreflective article of claim 2, wherein the segments are arranged in a pattern with the sequence: first segment, second segment, third segment.

4. The retroreflective article of claim 1, wherein the transparent polymeric layer has a thickness of from 0.01 to 10 micrometers.

5. The retroreflective article of claim 1, wherein the transparent polymeric layer comprises a urethane material, a urea material, an ester material, an epoxy material, a carbonate material, a (meth)acrylate material, an olefinic material, a vinyl chloride material, an amide material, an alkyd material, or a combination thereof.

6. The retroreflective article of claim 1, wherein the transparent polymeric layer comprises one or more additives, the additives comprising dyes, pigments, UV stabilizers, antioxidants, UV absorbers, property modifiers, performance enhancers, or combinations thereof.

7. The retroreflective article of claim 1, wherein the bead bond layer comprising a colorant comprises a polymeric binder material and at least one dye, or at least one pigment, or a combination thereof.

8. The retroreflective article of claim 1, wherein the reflective metal layer comprises a layer of layer of aluminum, silver, or a combination thereof.

9. The retroreflective article of claim 1, wherein the dielectric reflective layer comprises a layer of SiO$_2$, Na$_3$AlF$_6$, cryolite, CaF$_2$, MgF$_2$, ZnS, Nb$_2$O$_5$, TiO$_2$, Ta$_2$O$_5$, ZrO$_2$, or combinations thereof.

10. The retroreflective article of claim 1, wherein the dielectric reflective layer comprises a layer of CaF$_2$, ZnS, or a combination thereof.

11. The retroreflective article of claim 1, wherein the article is wash durable.

12. The retroreflective article of claim 1, wherein the article is flame retardant.

13. The retroreflective article of claim 1, wherein the bead bond layer comprising a colorant is color-fast.

14. The retroreflective article of claim 1, wherein at least one of the first and the second segments comprises a discontinuous segment.

15. An article of clothing comprising:
a fabric with a first major surface and a second major surface; and
a retroreflective appliqué attached to the first major surface of the fabric, the retroreflective appliqué comprising:
a layer of optical elements, the layer of optical elements being divided into at least a first segment and second segment, and the optical elements comprising:
transparent microspheres, a transparent polymeric layer, and at least one reflective layer; and
a bead bond layer comprising a colorant, wherein the optical elements are partially embedded in the bead bond layer, and wherein the first segment of optical elements and the second segment of optical elements are defined by the reflective layer of those segments, such that in the first segment of optical elements, the reflective layer consists essentially of a dielectric reflective layer, and in the second segment of optical elements, the reflective layer comprises a reflective metallic layer.

16. A method of preparing an article comprising:
providing a polymeric carrier layer with a first major surface and a second major surface;
providing transparent microspheres;
partially embedding the transparent microspheres into the first major surface of the polymeric carrier layer such that the beads at least partially protrude from the first major surface of the polymeric carrier layer to form a layer of microspheres;
depositing a transparent polymeric layer on the layer of microspheres;
depositing a first reflective layer on at least a portion of the first major surface of the polymeric carrier layer and the layer of microspheres;
depositing a second reflective layer on at least a portion of the first major surface of the polymeric carrier layer and the layer of microspheres such that at least a first segment of optical elements and a second segment of optical elements are formed, wherein the first segment of optical elements and the second segment of optical elements are defined by the reflective layer of those segments, such that the first segment of optical elements consists essentially of the first reflective layer or the second reflective layer, and the second segment of optical elements consists essentially of the first reflective layer and the second reflective layer; and
applying a bead bond layer comprising a colorant to the layer of microspheres.

17. The method of claim 16, further comprising removing the polymeric carrier layer to form a retroreflective article.

18. The method of claim 16, wherein depositing a first reflective layer on at least a portion of the first major surface of the polymeric carrier layer and the layer of microspheres comprises depositing a layer of reflective metal to a selected portion of the layer of microspheres.

19. The method of claim 18, wherein depositing the second reflective layer on at least a portion of the first major surface of the polymeric carrier layer and the layer of microspheres comprises depositing a layer of dielectric material to the entire layer of microspheres.

20. The method of claim 16, wherein depositing a first reflective layer on at least a portion of the first major surface of the polymeric carrier layer and the layer of microspheres comprises depositing a layer of dielectric material to the entire layer of microspheres.

21. The method of claim 20, wherein depositing the second reflective layer on at least a portion of the first major surface of the polymeric carrier layer and the layer of microspheres comprises depositing a layer of reflective metal to a selected portion of the layer of microspheres.

22. The method of claim 16, wherein the transparent polymeric layer has a thickness of from 0.01 to 10 micrometers.

23. The method of claim 16, further comprising drying and/or curing of the transparent polymeric layer disposed on the transparent microspheres.

24. An article comprising:
a polymeric carrier layer with a first major surface and a second major surface;
a layer of optical elements, partially embedded in the first major surface of the polymeric carrier layer, the layer of optical elements being divided into at least a first segment and second segment, and the optical elements comprising:
transparent microspheres, a transparent polymeric layer, and at least one reflective layer; and
a bead bond layer comprising a colorant, wherein the first segment of optical elements and the second segment of optical elements are defined by the reflective layer of those segments, such that in the first segment of optical elements, the reflective layer consists essentially of a dielectric reflective layer, and in the second segment of optical elements, the reflective layer comprises a reflective metallic layer.

* * * * *